(12) United States Patent
Palmas et al.

(10) Patent No.: US 7,601,304 B1
(45) Date of Patent: Oct. 13, 2009

(54) DISTRIBUTION APPARATUS FOR CONTACT OF HYDROCARBON COMPOUNDS WITH PARTICLES

(75) Inventors: Paolo Palmas, Des Plaines, IL (US); Daniel N. Myers, Arlington Heights, IL (US); Todd P. Mitchell, Bartlett, IL (US); James W. Althoff, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 751 days.

(21) Appl. No.: 10/936,871

(22) Filed: Sep. 9, 2004

(51) Int. Cl.
*B01J 8/18* (2006.01)
*F27B 15/00* (2006.01)

(52) U.S. Cl. .............. 422/140; 422/142; 422/139; 239/1; 261/19; 208/113

(58) Field of Classification Search ............. 422/142, 422/140, 139; 208/113; 239/1; 261/19
See application file for complete search history.

(56) References Cited

U.S. PATENT DOCUMENTS

| | | | |
|---|---|---|---|
| 3,071,540 A | 1/1963 | McMahon et al. | 208/163 |
| 4,097,243 A | 6/1978 | Bartholic | 23/288 S |
| 4,434,049 A | 2/1984 | Dean et al. | 208/153 |
| 4,555,328 A * | 11/1985 | Krambeck et al. | 208/157 |
| 4,717,467 A | 1/1988 | Haddad et al. | 208/113 |
| 4,985,136 A | 1/1991 | Bartholic | 208/153 |
| 5,017,343 A | 5/1991 | Cetinkaya | 422/140 |
| 5,108,583 A | 4/1992 | Keon | 208/157 |
| 5,296,131 A | 3/1994 | Raterman | 208/113 |
| 5,358,632 A | 10/1994 | Hedrick | 208/163 |
| 5,553,783 A | 9/1996 | Slavas et al. | 239/403 |
| 5,692,682 A | 12/1997 | Soule | 239/403 |
| 5,934,569 A | 8/1999 | Soule et al. | 239/468 |
| 6,010,620 A | 1/2000 | Myers et al. | 208/146 |
| 6,063,263 A * | 5/2000 | Palmas | 208/113 |
| 6,143,253 A | 11/2000 | Radcliffe et al. | 422/145 |
| 6,165,353 A | 12/2000 | Carpenter et al. | 208/146 |
| 6,257,504 B1 * | 7/2001 | Owen | 239/432 |
| 6,387,247 B1 | 5/2002 | Chen | 208/113 |
| 6,503,461 B1 | 1/2003 | Burgard et al. | 422/145 |
| 6,627,161 B1 | 9/2003 | Radcliffe et al. | 422/139 |
| 2002/0125337 A1* | 9/2002 | Chung et al. | 239/8 |
| 2004/0104149 A1 | 6/2004 | Lomas et al. | 208/146 |
| 2004/0227016 A1* | 11/2004 | Yagi et al. | 239/524 |

FOREIGN PATENT DOCUMENTS

| | | |
|---|---|---|
| EP | 1146106 A1 * | 10/2001 |
| GB | 1 530 809 | 11/1978 |
| WO | WO 01/44406 A1 | 6/2001 |
| WO | WO 03/020430 A1 * | 3/2003 |

OTHER PUBLICATIONS

U.S. Appl. No. 10/384,871, filed Mar. 7, 2003, Palmas et al.

* cited by examiner

*Primary Examiner*—Walter D Griffin
*Assistant Examiner*—Natasha Young
(74) *Attorney, Agent, or Firm*—James C Paschall

(57) ABSTRACT

Disclosed is an apparatus for injecting a plurality of uniform jets into an extended dispersion of moving catalyst particles within a reactor vessel. The apparatus comprises a plurality of outer conduits each for carrying atomizing fluid. A plurality of tips in the outer conduits each include a plurality of orifices for spraying a mixture of feed and atomizing fluid. Inner conduits with outlets within the outer conduits delivers feed to the tips of the outer conduits.

20 Claims, 4 Drawing Sheets

DISTRIBUTION APPARATUS FOR CONTACT OF HYDROCARBON COMPOUNDS WITH PARTICLES

BACKGROUND OF THE INVENTION

This invention relates to an apparatus for dispersing liquids into fluidized solids. More specifically, this invention relates to an apparatus for dispersing several streams of hydrocarbon feed into a stream of fluidized catalyst particles and a method for doing the same.

DESCRIPTION OF THE PRIOR ART

There are a number of continuous cyclical processes employing fluidized solid techniques in which an at least partially liquid phase stream containing hydrocarbon compounds contacts the fluidized solids in a contacting zone and carbonaceous or other fouling materials are deposited on the solids. The solids are conveyed during the course of the cycle to another zone where foulants are removed in a rejuvenation section or, more specifically, in most cases, carbon deposits are at least partially removed by combustion in an oxygen-containing medium. The solids from the rejuvenation section are subsequently withdrawn and reintroduced in whole or in part to the contacting zone.

One of the more important processes of this nature is the fluid catalytic cracking (FCC) process for the conversion of relatively high-boiling hydrocarbons to lighter hydrocarbons. The hydrocarbon feed is contacted in one or more reaction zones with the particulate cracking catalyst maintained in a fluidized state under conditions suitable for the conversion of hydrocarbons.

It has been a long recognized objective in the FCC process to maximize the dispersal of the hydrocarbon feed into the particulate catalyst suspension. Dividing the feed into small droplets improves dispersion of the feed by increasing the interaction between the liquid and solids. Preferably, the droplet sizes become small enough to permit vaporization of the liquid before it contacts the solids. It is well known that agitation or shearing can atomize a liquid hydrocarbon feed into fine droplets which are then directed at the fluidized solid particles. A variety of methods are known for shearing such liquid streams into fine droplets including U.S. Pat. No. 3,071,540; U.S. Pat. No. 4,434,049; U.S. Pat. No. 4,717,467 and U.S. Pat. No. 5,108,583.

The processing of increasingly heavier feeds in FCC type processes and the tendency of such feeds to elevate coke production and yield undesirable products has led to new methods and equipment for contacting feeds with catalyst. Feed injectors comprising a conduit with multiple orifices at one end are disclosed in U.S. Pat. No. 6,387,247 B1; U.S. Pat. Nos. 5,017,343 and 4,097,243. U.S. Pat. No. 5,358,632 discloses a distributor at the end of a conduit with multiple orifices in a distribution band. U.S. Pat. No. 6,627,161 B1 and US 2004/0104149 A1 disclose multiple feed injector conduits each with multiple orifices arranged along its length. Separate feed and atomization fluid nozzles with multiple orifices are disclosed in WO 01/44406 A1. U.S. Pat. No. 6,143,253 and GB 1 530 809 disclose multiple conduits each with one orifice at the end of the conduit. U.S. Pat. No. 5,553,783, U.S. Pat. No. 5,692,682, U.S. Pat. No. 5,934,569 disclose multiple orifices at an end of a feed injector conduit containing an internal mixing vane.

Particular recent interest has been given to methods of contacting FCC catalyst for very short contact periods such as in U.S. Pat. No. 4,985,136; U.S. Pat. No. 5,296,131 and U.S. Pat. No. 6,165,353. The type of injection desired for short contact time arrangements poses special problems for the injection of the feed into the catalyst. U.S. Ser. No. 10/384,871 discloses a distributor that injects feed in a linear array of streams that uniformly contact a stream of catalyst flowing in a compatible pattern. Typically, the uniform linear array of feed injection nozzles is arranged to provide a plurality of discrete jets that shoot the feed into a thin band of catalyst that falls in a direction at least partially transverse to the flow of the jets. U.S. Pat. No. 6,010,620 discloses a feed distributor for a short contact time fluid cracking unit with a single spray orifice on each of several distributor conduits.

Replacing feed injector nozzles requires a shut down of the reactor. U.S. Pat. No. 6,503,461 B1 discloses internal connections that facilitate injector conduit and tip replacement without cutting components, thereby reducing lost production time.

SUMMARY OF THE INVENTION

We have discovered that a feed distributor comprising an array of tips each with a plurality of orifices for spraying a mixture of feed and atomization fluid provides superior spray distribution. The invention comprises an apparatus and a process for injecting feed into a dispersion of moving catalyst particles within a contacting vessel. The apparatus comprises a plurality of outer conduits each having tips at an outlet end and inlet ends in fluid communication with a first fluid supply such as atomization fluid. Each of the tips includes a plurality of orifices for injecting a fluid mixture into the contacting vessel. The tips are disposed in an array. A plurality of inner conduits each has an outlet end projecting into a respective one of the outer conduits and an inlet end in fluid communication with a second fluid supply such as hydrocarbon feed. In an embodiment, the inner conduits may include a swirl chamber for swirling the fluid traveling through it.

An object of this invention is to provide an apparatus and method that provides superior contact between feed and catalyst resulting in high conversion to product.

Another object of this invention is to provide an apparatus that facilitates replacement of tips of feed injectors.

Additional objects, embodiments, and details of this invention can be obtained from the following detailed description.

DETAILED DESCRIPTION OF THE INVENTION

Figure 1:
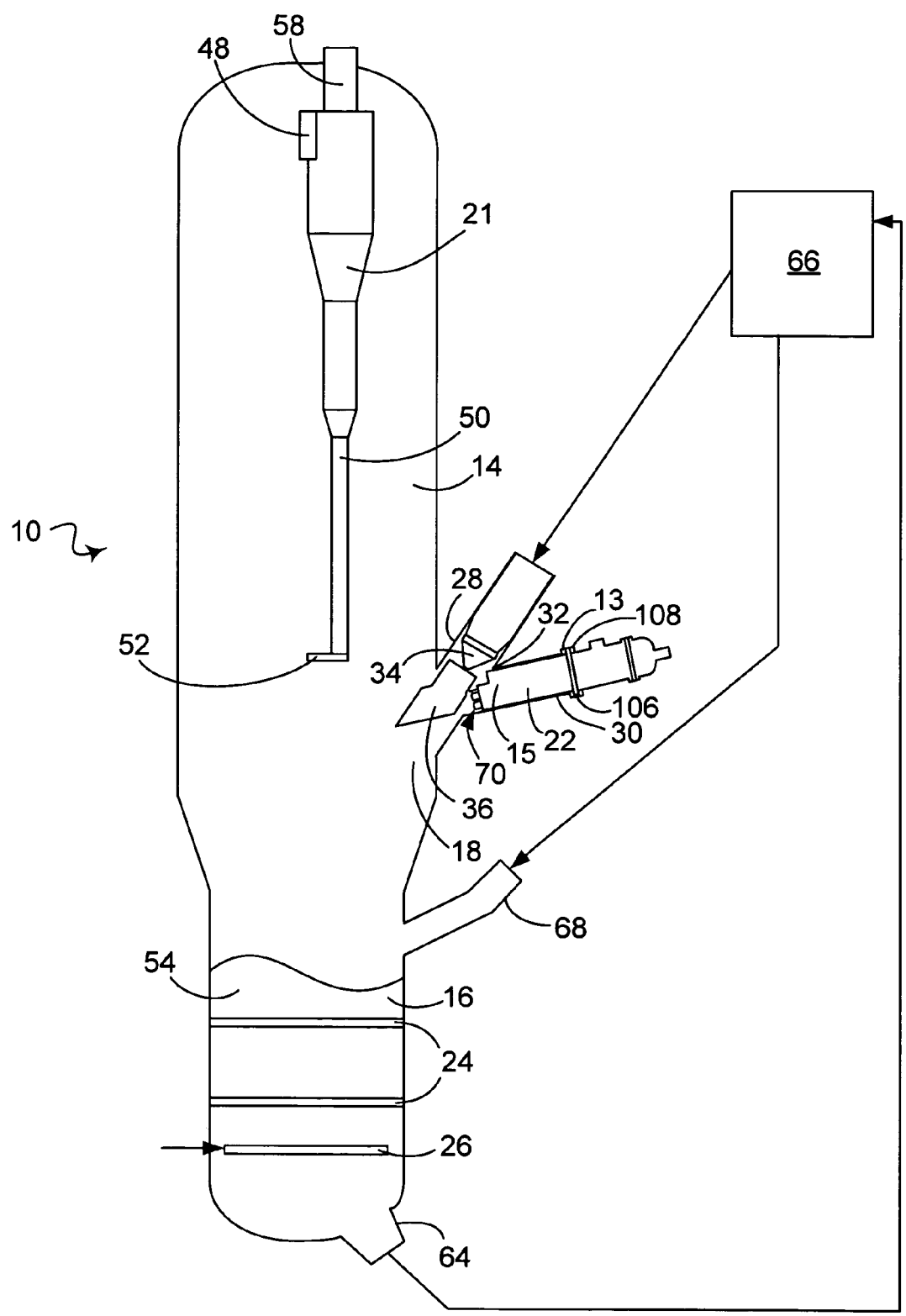
FIG. 1 is a schematic illustration of a short contact time FCC reactor arrangement that uses a distributor and method of this invention.

This invention is more fully explained in the context of an FCC apparatus. FIG. 1 shows an FCC apparatus that is arranged in accordance with this invention. The description of this invention in the context of the specifically disclosed apparatus and arrangement is not meant to limit it to the details disclosed therein. The FCC arrangement shown in FIG. 1 consists of a reactor 10 that includes a separating region 14, a collection region 16 and a contacting region 18. The separating region 14 includes a separator such as a cyclone 21. The collection region 16 may include a series of trays 24 and a distributor 26 for the distribution of stripping media. The contacting region 18 comprises a catalyst inlet nozzle 28 and a feed distributor nozzle 30. The arrangement circulates catalyst and contacts feed in the manner hereinafter described.

Fresh regenerated catalyst, spent catalyst, or a mixture thereof enters the reactor 10 through the catalyst inlet nozzle 28 which typically communicates with the end of a catalyst conduit (not shown). The feed distributor nozzle 30 and the catalyst inlet nozzle 28 join at a joint 32. Hydrocarbon feed is injected into the contacting region 18 through the feed distributor nozzle 30 by a distributor 15. The distributor 15 may include a shroud 22 having an outer end extending into the reactor 10 and a distributor head 70 that atomizes the feed into several streams of fine liquid droplets. The streams provide an array of feed jets that transversely contacts a dispersion of moving catalyst particles such as a stream of catalyst falling from the catalyst inlet nozzle 28. The catalyst inlet nozzle 28 contains a funnel 34 fixed to the inside wall of the catalyst inlet nozzle 28. The funnel 34 dispenses catalyst through an opening (not shown) to form the catalyst into a curtain or other configuration that falls into a catalyst chute 36. The array of feed injected by the distributor 15 contacts the falling curtain of catalyst in the catalyst chute 36.

The feed from the distributor 15 preferably contacts the falling catalyst in a transverse direction to obtain a quick contacting between the feed and the catalyst particles. The distributor 15 may produce a spray pattern that is compatible with the configuration of the catalyst stream. Conventional temperatures for the feed are in the range of from 149° to 316° C. (300° to 600° F.).

Contact of the feed with the catalyst causes a rapid vaporization and a high velocity discharge of catalyst into the reactor 10. Contact between the feed and catalyst produces a vaporous hydrocarbon product while carbon is deposited or "coked" on the catalyst. Catalyst disengages from the product vapor and falls into a dense bed of catalyst 54 in the collection region 16. Vaporous product ascends into the separating region 14 of the reactor 10.

The separator, typically comprising the cyclone 21, pulls vapor product and entrained catalyst through an inlet 48 in the cyclone 21. The cyclone 21 further separates the entrained catalyst from the product vapor. The product vapor with trace amounts of entrained catalyst exits the cyclone 21 through an outlet conduit 58 which carries the effluent stream out of the reactor 10 for further processing. The entrained catalyst falls by gravity through a dipleg 50 and out through a valve 52, such as a counter-weighted flapper valve, into the dense bed of catalyst 54 in the collection region 16. The invention also contemplates use of a cyclone external to the reactor 10.

The collection region 16 may serve as a stripping zone for the recovery of entrained and adsorbed hydrocarbons from catalyst entering the collection region 16. Stripping gas enters the collection region 16 through the distributor 26. A dispersed stripping gas, such as steam, rises upwardly through the catalyst. The series of trays 24 may provide redistribution of the stripping medium and stripped hydrocarbons as they pass upwardly through the bed 54. A nozzle 64 withdraws the stripped catalyst for regeneration in a regenerator vessel 66 and/or recycle to the catalyst inlet nozzle 28 for recontacting of catalyst with the feed. The optional addition of hot regenerated catalyst to the bed 54 through a conduit 68 can facilitate stripping by raising the temperature in the collection region 16. The stripping medium as well as the stripped vapor hydrocarbon product will ordinarily rise and combine with the disengaged vapor hydrocarbon product and are eventually drawn into the inlet 48 of the cyclone 21.

A blind flange 106 retains the shroud 22 and can be used as an integral part of the shroud. Bolting the blind flange 106 to an open flange 13 on the feed distributor nozzle 30 of the reactor 10 facilitates insertion and removal of the distributor 15. The open flange 13 on the outside of the feed distributor nozzle 30 and a flange 108 work together to sandwich the blind flange 106 into position in the feed distributor nozzle 30. Bolting of the flange 108 into position on the open flange 13 positions the distributor head 70 at the desired location within the reactor 10.

The catalyst used in the reactor 10 can include any of the well-known catalysts that are used in the art of fluidized catalytic cracking. These compositions include amorphous-clay type catalysts which have, for the most part, been replaced by high activity, crystalline alumina silica or zeolite-containing catalysts. Zeolite-containing catalysts are preferred over amorphous-type catalysts because of their higher intrinsic activity and their higher resistance to the deactivating effects of high temperature exposure to steam and exposure to the metals contained in most feedstocks. Zeolites are the most commonly used crystalline alumina silicates and are usually dispersed in a porous inorganic carrier material such as silica, alumina, or zirconium. These catalyst compositions may have a zeolite content of 30% or more. Zeolite catalysts used in the process of this invention will preferably have a zeolite content of from 25 to 80 wt-% of the catalyst. The zeolites may also be stabilized with rare earth elements and contain from 0.1 to 10 wt-% of rare earths.

Suitable liquid media for this invention include any liquid stream that will enter the distributor as a liquid and may be mixed with a gas. For the FCC process, feedstocks suitable for processing by the method of this invention, include conventional FCC feeds and higher boiling or residual feeds. The most common of the conventional feeds is a vacuum gas oil which is typically a hydrocarbon material having a boiling range of from 343° to 552° C. (6500 to 1025° F.) and is prepared by vacuum fractionation of atmospheric residue. These fractions are generally low in coke precursors and heavy metals which can deactivate the catalyst. Heavy or residual feeds, i.e., boiling above 499° C. (930° F.) and which have a high metals content, are finding increased usage in FCC units.

Figure 2:
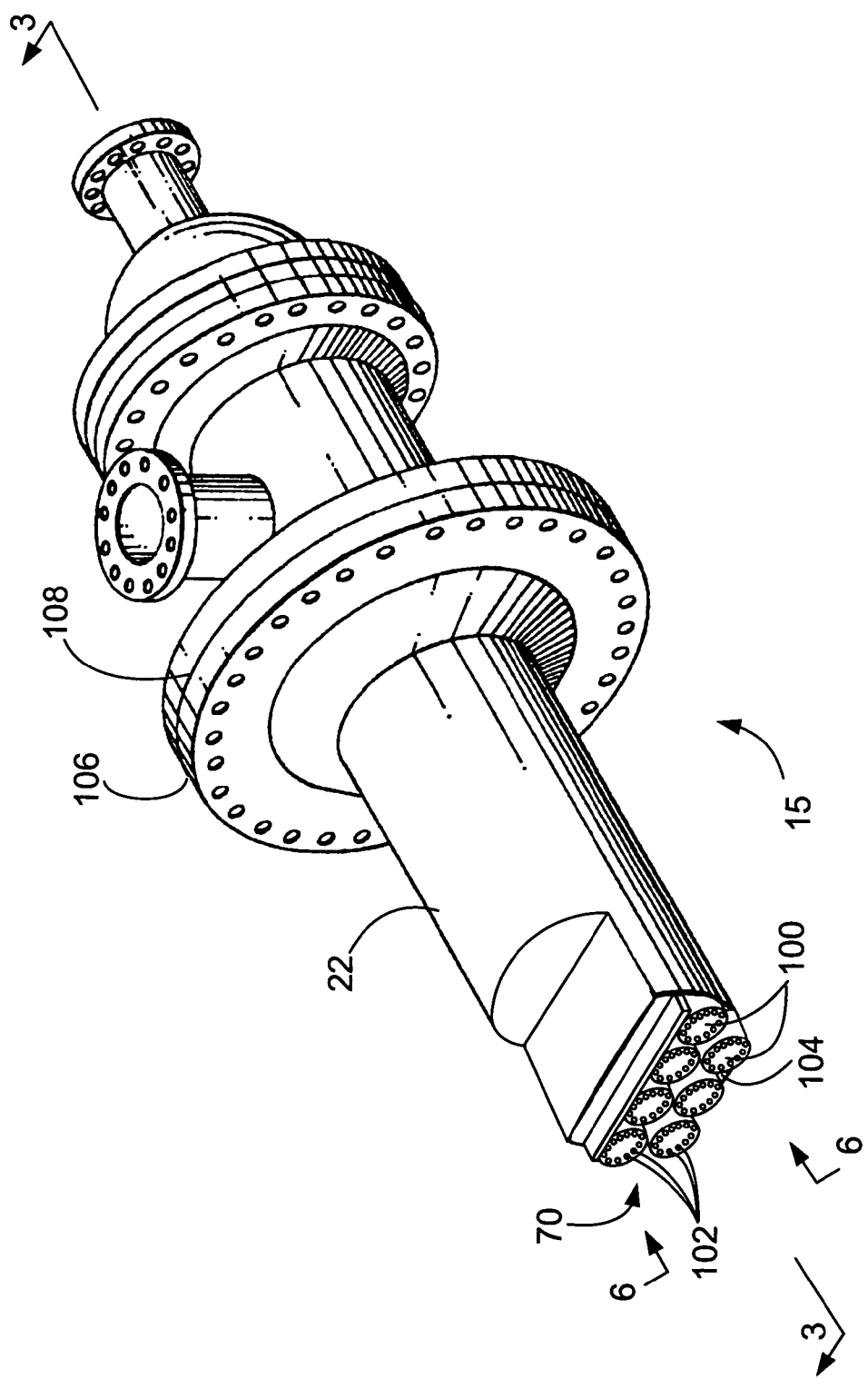
FIG. 2 is an enlarged isometric view of the distributor of this invention depicted in FIG. 1.

FIG. 2 shows a preferred outer arrangement for the distributor 15. As shown in FIG. 2, distributor tips 100 of the distributor head 70 are supported in front of an outer face 104 on the outer end of the shroud 22. The flanges 106, 108 are also shown in FIG. 2. The distributor tips 100 of the distributor 15 each include a plurality of orifices 102 for injecting feed. The orifices are disposed in a circular pattern in an embodiment and are typically sized to provide a fluid velocity in a range of from 3 to 122 m/sec (10 to 400 ft/s) and suitably in the range of 15 to 91 m/sec (50 to 300 ft/s). In accordance with typical FCC practice, the feed exits the orifices 102 in the tips 100 openings as a spray. Droplet size within the spray and the velocity of the spray determines momentum of the feed as it enters the interior of the reactor. It is necessary that the feed have sufficient momentum to penetrate the falling stream of catalyst. However, the velocity of the feed injection is inversely proportional to the size of the droplets in the emanating spray. Higher velocities for the spray tend to directly increase the momentum of the spray but indirectly decrease the momentum by reducing the size of the exiting droplets.

Consequently, the reduced momentum that results directly from lower spray velocities is offset by the typical production of larger droplets.

Figure 3:
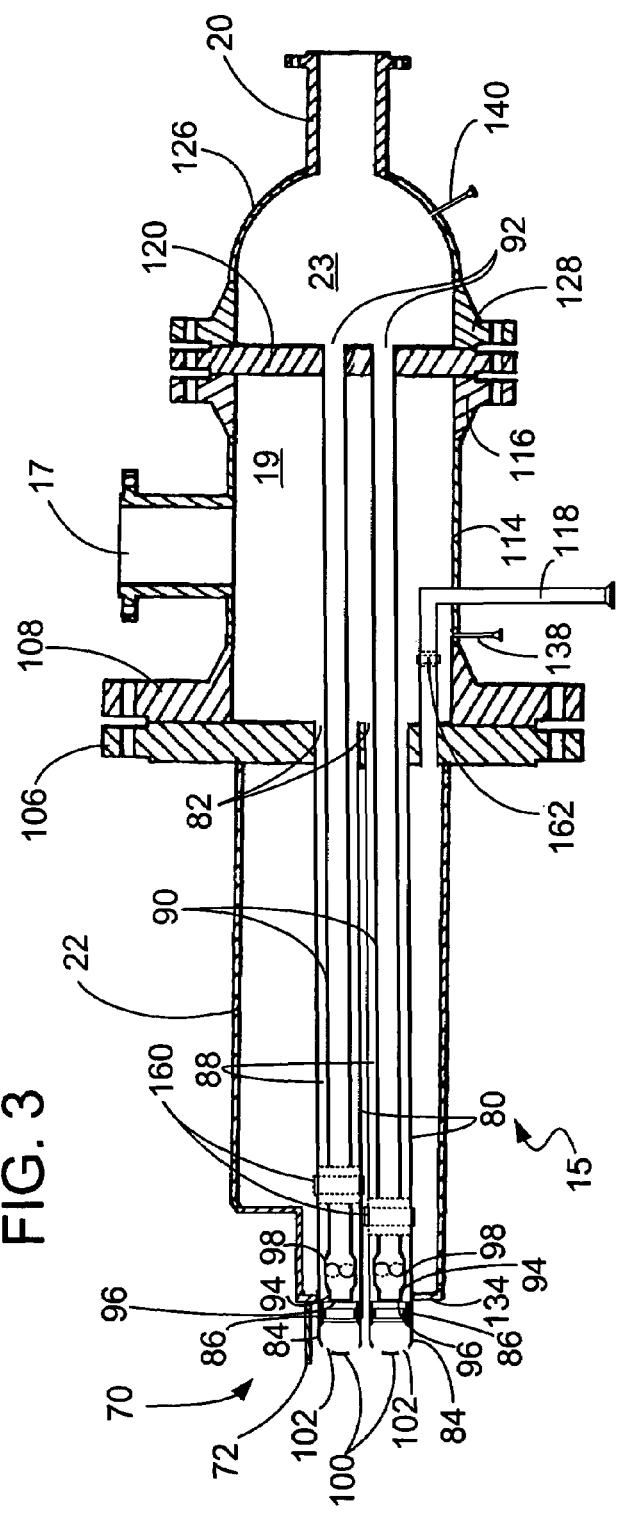
FIG. 3 is a sectional view of the distributor of FIG. 2 taken across segment 3-3.

Feed momentum should be balanced against the need to disperse the feed into smaller droplets to facilitate feed vaporization. The dispersion of the feed into finer droplets is promoted by imparting sufficient energy into the liquid. Where desired any of the prior art methods may be used in combination with the feed injection arrangement of this invention. In most cases, this invention will be practiced with some addition of a gaseous atomization fluid such as steam to the feed before discharge through the orifices. The addition of the gaseous material can aid in the atomization of the feed. In some cases a minimum quantity of gaseous material, equal to about 0.2 wt-% of the combined liquid and gaseous mixture, may be comingled with the liquid before its discharge through the nozzles. Typically the quantity of any added steam is no more than 0.05 to 1.0 wt-% of the combined gaseous and liquid mixture but more steam may be used. The liquid or feed entering the distributor 15 will usually have a temperature below its initial boiling point but a temperature above the boiling point of any steam or gaseous medium that enters the distributor 15 along with the liquid.

FIG. 3 shows the internals of the distributor 15 behind the distributor head 70. The blind flange 106 serves as a tube sheet to support a plurality of outer conduits 80. The outer conduits are disposed generally parallel to each other. Inner ends 82 defining inlets of the outer conduits 80 are secured to bores through the blind flange 106 so as to fluidly communicate with a first fluid chamber 19. The flange 108 is integral with a chamber wall 114 which is integral with a flange 116 and together with blind flanges 106, 120 define the chamber 19. The chamber 19 may be used for the distribution of hydrocarbon feed or gaseous atomization fluids fed from a nozzle 17. In an embodiment, gaseous atomization fluid such as steam is delivered to the chamber 19. The outer conduits 80 include outer ends 84 defining outlets equipped with the tips 100 and the orifices 102 as previously described. The tips 100 define an array and in an embodiment all face in the same general direction. Converging and diverging tips 100 are also contemplated. The blind flange 120 serves as a tube sheet to support a plurality of inner conduits 90. Inner ends 92 defining inlets of the inner conduits 90 are secured to bores through the blind flange 120 so as to fluidly communicate with a second fluid chamber 23. The second fluid chamber 23 is defined by the inner side of the blind flange 120 and a chamber wall 126 that is integral with a flange 128. The second fluid chamber 23 may be used for the distribution of hydrocarbon feed or gaseous atomization fluids fed from a nozzle 20. In an embodiment, liquid hydrocarbon feed is delivered to the chamber 23 via the nozzle 20. The inner conduits 90 include outer ends 94 which each project into the interior of a respective outer conduit 80. Each outer end 94 comprises outlets 96 and swirl chambers 98. The outlets 96 are axially even with shoulders 86 which reduce the inner diameter of the outer conduits 80. The outlets 96 of the inner conduits 90 fluidly communicate with the interior of the outer conduits 80.

A first fluid, typically atomization fluid such as steam, flows from the nozzle 17 into the chamber 19 and is distributed into the outer conduits 80 in annular passages 88 defined, at least in part, between the outer diameter of the inner conduits 90 and the inner diameter of the outer conduits 80. A second fluid, typically hydrocarbon feed, flows from the nozzle 20 into the chamber 23 and is distributed into the inner conduits 90. Respective fluids flow from the inner to the outer ends of the conduits 80, 90. As the second fluid in the inner conduits 90 approaches the outer ends 94, angular movement is imparted to the second fluid in the swirl chamber 98 before it exits the outlets 96 of the inner conduits 90. At the outlet 96, the first fluid in the annular passages 88 of the outer conduits 80 is urged into contact with the swirling second fluid by the shoulders 86 to begin thorough shearing and atomization of the second fluid. The mixture of first and second fluids travel past the shoulders 86 through the outer end 84 and to the tips 100 of the outer conduits 80. From the tips, the mixture of first and second fluids is injected through the orifices 102 to contact the stream of catalyst.

In an embodiment, the shroud 22 surrounds the outer conduits 80 extending from the blind flange 106. The blind flange 106 supports the outer conduits 80 at the inner ends 82. The outer ends 84 of the outer conduits 80 extend through openings in an outer face 134. The shroud 22 may have a generally cylindrical shape or any shape that suits the location into which it is inserted and provides adequate stiffness to guide the ends of the outer conduits 80. However, the shroud 22 may be an open structure that provides sufficient rigidity to prevent vibration or damage to the outer conduits 80. Preferably, the shroud 22 is essentially closed about the blind flange 106 to maximize protection and support of the conduits. The cylindrical shape is preferred since it also accommodates location of the distributor into a traditional pressure vessel as well as a nozzle of an FCC standpipe. The interior of the shroud 22 may be filled with an insulating material such as fibrous blanket insulation or refractor lining materials to reduce the temperature within the shroud. A delivery pipe 118 may deliver steam or other gaseous inert purge to the closed shroud 22 to reduce hydrocarbons from entering the chamber defined by the shroud 22 and forming coke. The delivery pipe 118 may enter the chamber 19 and extend through a bore in the blind flange 106 to fluidly communicate with the interior of the shroud 22. Drain nozzles 138, 140 may also be provided in the chambers 19 and/or 23.

Depending upon the location of the shroud, additional abrasion-resistant linings may be provided on the outside to protect it from erosion. Although the flow of catalyst into which the tips 100 inject the dispersed mixed fluids is spaced away from the tips 100 so as to avoid direct erosion under ordinary circumstances, erosion from catalyst may still affect the tips 100 of the distributor 15. Hence, use of erosion-resistant metals and refractory linings that are well known to those skilled in the art may be advantageous. In an embodiment, a catalyst shield 72 may be used to shield the tips 100 from catalyst erosion.

The outer conduits 80 in FIG. 3 are arrayed generally parallel to each other. Because the outer ends 94 of the inner conduits 90 are disposed and project into the outer conduits 80 in concentric fashion, the inner conduits 90 are also arrayed generally parallel to each other. The outer ends 84 are secured to the outer conduits 80 by low profile connectors 160 as disclosed in U.S. Pat. No. 6,503,461 B1, which is incorporated herein by reference. In the event that the tips 100 wear, they can be easily replaced by disconnecting the low profile connector 160 connecting the worn outer end 84 to the outer conduit 80 and connecting a new outer end 84 and tip 100 to the same outer conduit 80 by use of the low profile connector 160. Other conduits such as the delivery pipe 118 may also make use of low profile connectors 162.

FIG. 4 is an enlarged partial view of FIG. 3 to illustrate the swirl chamber 98 of the inner conduit 90 within the outer end 84 of the outer conduit 80. The swirl chamber 98 is an enlarged segment of the inner conduit 90 and may have one of several devices for imparting angular momentum to the second fluid flowing therethrough. One suitable device, similar to the sinusoidal spray member disclosed in U.S. Pat. No. 5,553,783 incorporated herein by reference, is described as follows. Swirl imparting means are provided by transversely extending segmental vanes 110 and 112 which impede fluid flow from the inner end 92 (FIG. 3) to the outlets 96 at the outer end 94 of the inner conduits 90. The vanes 110 and 112 each comprise two generally semicircular segments when viewed radially which is the direction of fluid flow through the vanes 110 and 112. The two sinusoidal vanes 110 and 112 are juxtaposed in edge-to-edge relation defining a figure "8" which extends horizontally across the swirl chamber 98.

Figure 4:
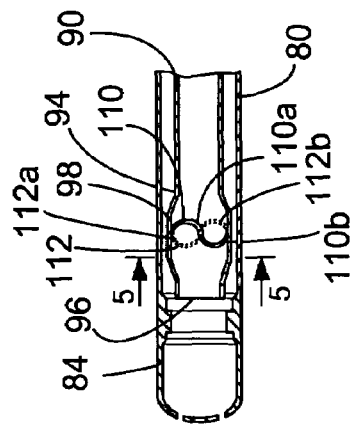
FIG. 4 is an enlarged partial view of FIG. 3.
Figure 5:
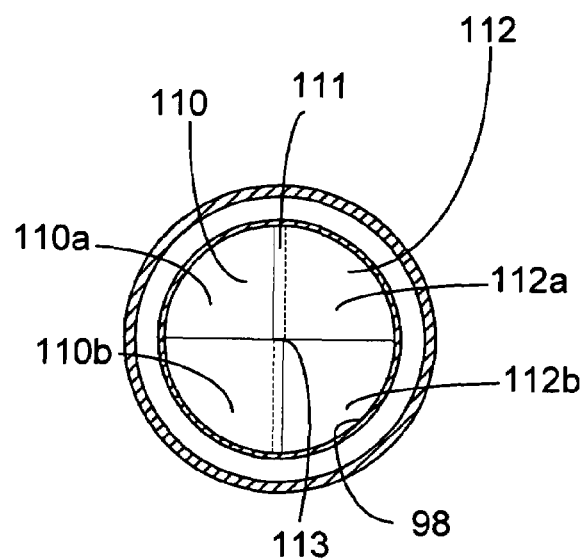
FIG. 5 is a sectional view taken across segment 5-5 in FIG. 4.

FIG. 5 shows a sectional view of the vanes 110 and 112 looking upstream from segment 5-5 in FIG. 4. With reference to FIGS. 4 and 5, the vane 110 has a concave lobe 110a facing upstream in one quadrant of the swirl chamber 98 and a convex lobe 110b in a lower adjacent quadrant. Similarly, the vane 112 has a convex lobe 112a in a quadrant of the chamber 98 diametrically opposite convex lobe 110b of the vane 110 and a concave lobe 112b in a quadrant diametrically opposite the concave lobe 110a of the vane 110. Inner edges of the vanes 110 and 112 may overlap to some extent as at a band 111 to ensure against direct axial flow to the outlet 96. A slot 113 in the vane 112 accommodates the overlapping of the vanes 110, 112. The vanes are approximately sinusoidal and, as best shown in FIG. 4, the cylindrically curved lobe portions of each of the sinusoidal vanes 110, 112 are interconnected by axially extending leg portions which cross at about the center of the swirl chamber 98.

Figure 6:
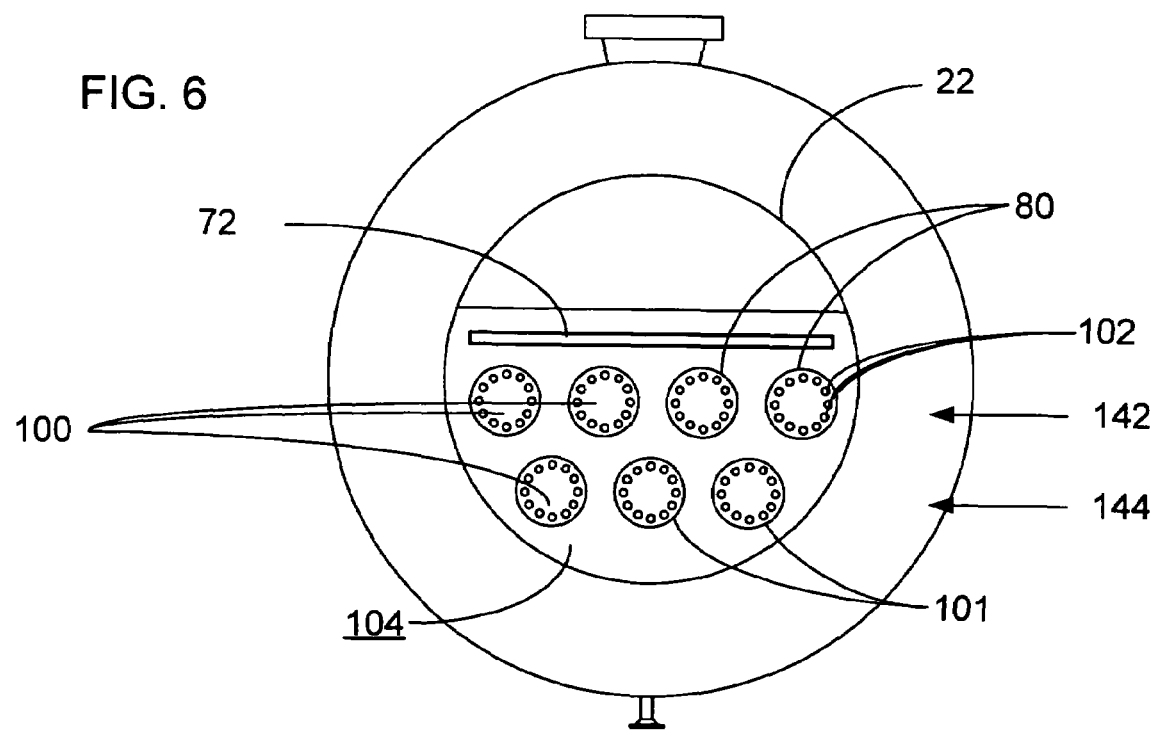
FIG. 6 is an enlarged frontal view of the distributor of FIG. 2 taken from segment 6-6.

FIG. 6 show the tips 100 disposed in an array below the catalyst shield 72. An "array" is any plurality of the outer conduits 80 that intersect an imaginary plane. In an embodiment, an array is a plurality of the tips 100 that intersect an imaginary plane. The outer conduits 80 may be arranged to define an array of the tips 100 and/or the outer conduits 80. A center line through the array may be offset from the horizontal diameter of the cylindrical outline of the shroud 22. The array may define upper and lower rows 142 and 144, respectively. In an embodiment, the tips 100 define an array that includes a plurality of rows and each tip 100 is vertically offset from other tips. An array comprising a single row of the tips 100 may be suitable. The tips 100 extend though openings 101 in the outer face 104 of the shroud 22. The openings 101 in the outer face 104 define an array that is the array of a cross section of the outer conduits 80. The openings 101 position the tips 100 with respect to each other. The tips 100 are spaced to provide a broad band of arrayed feed streams for contacting catalyst in a desired flow pattern. The orifices 102 in the tips 100 may be configured to provide any desired flow pattern of dispersed, parallel or converging atomized liquid out of each tip 100. The orifices 102 in the tips 100 in an embodiment each has a circular configuration that provides a concentrated cylindrical jet or may have an oval configuration to provide fan shaped patterns to increase the vertical distance over which the dispersed feed contacts the dispersion of moving catalyst particles. Other configurations are contemplated. In FIG. 6, twelve circular orifices are evenly spaced in a circular pattern about the tips 100 of seven outer conduits 80 in the two rows 142, 144. Hence, each tip 100 sprays twelve jets of highly atomized feed into the catalyst stream. In an embodiment, each orifice 102 defines a longitudinal axis that is parallel to a longitudinal axis through the outer conduits 80. More or less outer conduits 80 and/or orifices 102 are contemplated. Additionally, other orifice patterns may be suitable.

EXAMPLE

In a commercial application, a feed distributor described in U.S. Pat. No. 6,010,620 comprising an array of nozzles each including one orifice was replaced with the feed distributor of the present invention comprising an array of tips each with a plurality of orifices. Preliminary data in the Table below indicates the following differences in performance. The data for the new feed distributor was taken under conditions of a slightly lower reactor temperature and higher slurry recycle or feed con carbon levels to maintain adequate regenerator temperature. Other operating conditions and feed properties were similar. ASTM D-86 was used to calculate naphtha and light cycle oil content.

TABLE

| Property | Performance Delta |
|---|---|
| Standard Conversion, LV % | 3.1 |
| Overall Liquid Volume Recovery, % | 1.5 |
| $C_2$-, wt-% | 0.01 |
| $C_3$, LV % | 1.2 |
| $C_4$, LV % | 1.6 |
| Naphtha (90 LV % at 380° F.), LV % | 1.7 |
| Light Cycle Oil (90 LV % at 600° F.), LV % | −1.8 |
| Main Column Bottoms, LV % | −1.4 |
| Coke, wt-% | 0.07 |

The preliminary data shown in the table indicates significant improvement in all areas except in coke make and $C_2$—. The degree of improvement provided by the distributor of the present invention as indicated by the data was not expected.

The invention claimed is:

1. An apparatus for injecting feed into a dispersion of moving catalyst particles within a reactor, said apparatus comprising:
   a plurality of outer conduits each having tips at an outlet end and inlet ends in fluid communication with a first fluid supply, each of said tips including a plurality of orifices for injecting feed into said reactor, and said tips being disposed in an array; and
   a plurality of inner conduits each having an outlet end projecting into a respective one of said outer conduits and an inlet end in fluid communication with a second fluid supply.

2. The apparatus of claim 1 wherein each of said inlet ends of said outer conduit are fixed to a respective bore in a first tube sheet.

3. The apparatus of claim 2 wherein each of said inlet ends of said inner conduits are fixed to a respective bore in a second tube sheet.

4. The apparatus of claim 3 wherein said first and second tube sheets define a first chamber for said first fluid supply.

5. The apparatus of claim 3 wherein said second tube sheet defines a second chamber for said second fluid supply.

6. The apparatus of claim 1 further including a shroud having an outer face extending into said reactor and surrounding said outer conduits.

7. The apparatus of claim 6 wherein said tips of said outer conduits extend from said outer face of said shroud.

8. The apparatus of claim 7 further including a shield extending from said outer face of said shroud to protect said tips from catalyst.

9. The apparatus of claim 1 further including low profile mechanical connectors fixing two portions of said outer conduit together.

10. The apparatus of claim 1 wherein the outer conduits are generally parallel to each other.

11. An apparatus for injecting feed into a dispersion of moving catalyst particles within a reactor, said apparatus comprising:
- a plurality of outer conduits each having tips at an outlet end and inlet ends in fluid communication with a first fluid supply, each of said tips including a plurality of orifices for injecting feed into said reactor, and said tips being disposed in an array; and
- a plurality of inner conduits each having an outlet end projecting into a respective one of said outer conduits, an inlet end in fluid communication with a second fluid supply and a swirl chamber for swirling fluid traveling therethrough.

12. The apparatus of claim 11 wherein each of said inlet ends of said outer conduit are fixed to a respective bore in a first tube sheet.

13. The apparatus of claim 12 wherein each of said inlet ends of said inner conduits are fixed to a respective bore in a second tube sheet.

14. The apparatus of claim 13 wherein said first and second tube sheets define a first chamber for said first fluid supply.

15. The apparatus of claim 13 wherein said second tube sheet defines a second chamber for said second fluid supply.

16. The apparatus of claim 11 further including an extended shroud having an outer face surrounding said outer conduits.

17. The apparatus of claim 16 wherein said tips of said outer conduits extend from said outer face of said shroud.

18. The apparatus of claim 11 wherein said outer conduits are generally parallel to each other.

19. The apparatus of claim 11 further including low profile mechanical connectors fixing two portions of said outer conduit together.

20. A process for using the apparatus of claim 1.

\* \* \* \* \*

UNITED STATES PATENT AND TRADEMARK OFFICE
CERTIFICATE OF CORRECTION

PATENT NO. : 7,601,304 B1  
APPLICATION NO. : 10/936871  
DATED : October 13, 2009  
INVENTOR(S) : Palmas et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1407 days.

Signed and Sealed this

Fifth Day of October, 2010

David J. Kappos  
*Director of the United States Patent and Trademark Office*